United States Patent
Tully et al.

(10) Patent No.: US 8,825,749 B2
(45) Date of Patent: Sep. 2, 2014

(54) METHOD OF TRACKING OFFLINE USER INTERACTION IN A RENDERED DOCUMENT ON A MOBILE DEVICE

(75) Inventors: Timothy Tully, San Jose, CA (US); Benjamin Graham, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 47 days.

(21) Appl. No.: 13/278,999

(22) Filed: Oct. 21, 2011

(65) Prior Publication Data
US 2013/0103740 A1    Apr. 25, 2013

(51) Int. Cl.
*G06F 15/16*    (2006.01)

(52) U.S. Cl.
USPC .......................................... 709/203; 709/246

(58) Field of Classification Search
None
See application file for complete search history.

(56) References Cited

U.S. PATENT DOCUMENTS

| | | | |
|---|---|---|---|
| 7,826,408 B1 * | 11/2010 | Vleugels et al. | 370/328 |
| 2001/0003828 A1 * | 6/2001 | Peterson et al. | 709/219 |
| 2005/0044139 A1 * | 2/2005 | Christian et al. | 709/203 |
| 2005/0188051 A1 * | 8/2005 | Sneh | 709/213 |
| 2007/0255617 A1 * | 11/2007 | Maurone et al. | 705/14 |
| 2009/0210890 A1 * | 8/2009 | Tully | 719/331 |
| 2009/0271514 A1 * | 10/2009 | Thomas et al. | 709/224 |
| 2009/0327209 A1 * | 12/2009 | Dunietz et al. | 707/1 |
| 2010/0077303 A1 * | 3/2010 | Jones et al. | 715/700 |
| 2010/0318434 A1 * | 12/2010 | Messer | 705/14.73 |
| 2011/0078268 A1 * | 3/2011 | Martin et al. | 709/206 |
| 2012/0084344 A1 * | 4/2012 | Kalyanasundaram et al. | 709/203 |

FOREIGN PATENT DOCUMENTS

EP    1278308 A2 *    1/2003

OTHER PUBLICATIONS

Tully, T., "Real-Time Data Collection Via Hierarchical Web Page Parsing" published Aug. 20, 2009 downloaded from the Internet on Aug. 14, 2012 < http://www.faqs.org/patents/app/20090210890#b > 8 pages.
"Flurry Analytics" dated 2012, downloaded from the Internet on Aug. 14, 2012 < http://www.flurry.com/flurry-analytics.html > 6 pages.

* cited by examiner

*Primary Examiner* — Jeffery Williams
*Assistant Examiner* — Henry Tsang
(74) *Attorney, Agent, or Firm* — Hickman Palermo Truong Becker Bingham Wong LLP

(57) ABSTRACT

While a device is offline, usage data is tracked on the device. The usage data is uploaded to a server after the device is again connected to a network. Applications that run on mobile devices typically embed a browser to display content. Unfortunately, mobile devices also frequently disconnect from the associated network. A system tracks usage data by using JavaScript in the browser to communicate with the native device, which then buffers the usage data for future upload. This is done by installing, in each application, a "protocol handler" that listens for a request over a particular protocol. The protocol handler intercepts the requests and stores the usage data locally on the device. Subsequently, when the device detects network connectivity, the device uploads the data to servers that collect data for aggregation and presentation.

20 Claims, 5 Drawing Sheets

METHOD OF TRACKING OFFLINE USER INTERACTION IN A RENDERED DOCUMENT ON A MOBILE DEVICE

FIELD OF THE INVENTION

The present invention relates to storing usage data while the user is offline and uploading the usage data later when a connection is subsequently established.

BACKGROUND

Mobile applications typically embed an Hypertext Markup Language ("HTML") renderer ("web view") to display HTML content. Providing a web view within a mobile application allows the content provider more flexibility than a proprietary user interface. Furthermore, a web view may reduce portability issues between various platforms. For example, an editor may create the layout for a given article and may deploy that article on any device that contains a web view or browser.

Content providers often incorporate analytic services and/or libraries to track usage data in real-time, e.g., which links were clicked, how long a user viewed a particular article, what content was most popular, where the user is geographically located, etc. Content providers often use the results to determine a popular demographic, to maximize page impressions, to gauge the effectiveness of certain layouts, to determine the most relative content, to calculate the top referring sites that most frequently bring users to a specific page, etc. Indeed, analytic service providers are generally selected based on uptime, data resolution, and latency.

On mobile devices, however, a connection to a network, e.g., the Internet, cannot always be maintained; furthermore, latency can create a bottleneck, slowing uploads, and reducing the battery life of the device. To improve the user experience, some of these mobile applications pre-fetch content to be viewed offline within the web view. While pre-fetching content to be viewed offline provides the user with a better experience, the content provider is left without any usage data since the usage data cannot be uploaded while offline.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
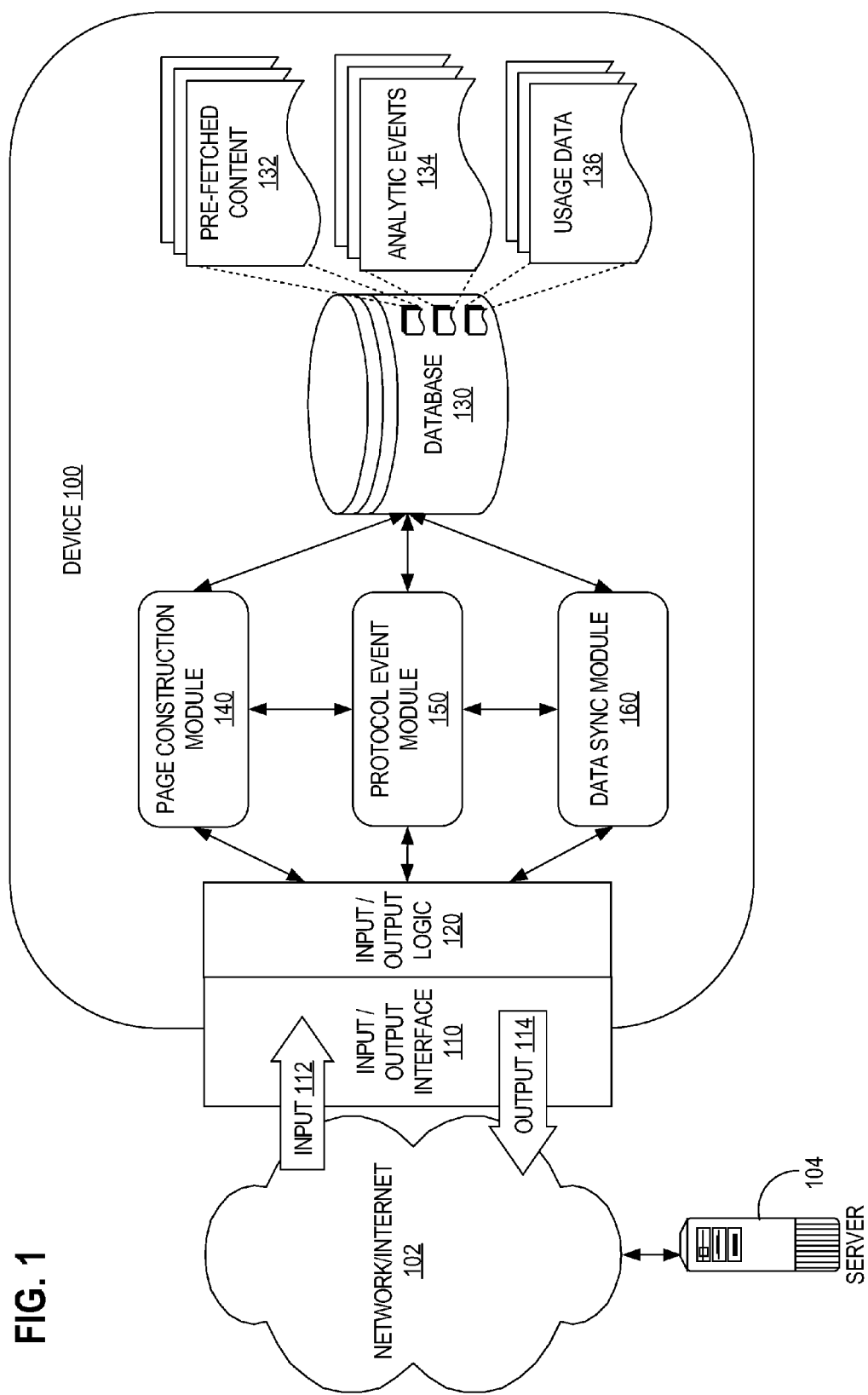
FIG. 1 is a block diagram of a system for tracking offline usage data from a hardware point of view, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are methods for tracking usage data on a device, while the device is offline, i.e. not connected to any network, and uploading the usage data after the device is again connected to a network. Applications that run on mobile devices typically embed a browser to display content. Unfortunately, mobile devices also frequently disconnect from the associated network. In order to provide a user with continuous service, even while the device is offline, applications pre-fetch content to be shown upon request by the user.

In one embodiment, the system tracks usage data offline by using JavaScript in the browser to talk to the native device, which then buffers the usage data for future upload. This is done by installing a "protocol handler" in each application, which listens for a request over a particular protocol. The protocol handler intercepts analytic events, and derives usage data, which includes Uniform Resource Locator ("URL") requests, and stores the usage data locally on the device.

For example, prior to presenting pre-fetched content, the system traverses the document object model ("DOM"), collects the links contained therein—without modifying those links, and buffers those links into memory. Then, the in-memory link data are serialized, and, for each link, image requests are made in JavaScript with a "yi13n://" protocol. This technique allows the system to determine quickly if the usage data associated with an analytic event is meant to be recorded. When the system detects that a user clicked on a link, the protocol handler intercepts that event. The device locally stores usage data identifying the selected link. Subsequently, when the device detects that it is connected to a network, e.g. the Internet, the device uploads the data to servers that collect the usage data for aggregation and presentation.

Requests may be generated dynamically, intercepted, stored, and then made subsequent to establishing a connection. For example, a web beacon request may be generated when a user selects a link. Web beacons collect information about web browsing activities such as the address of a visited page, the address of a referrer page, the time of viewing a page, the browsing environment of a client and or display settings of the device. Upon construction of the web beacon request, the request URL is generated with the "yi13n://" protocol, instead of the "http://" protocol. When the request to the web beacon is made with the "yi13n://" protocol, as in the example above, the request is intercepted by the protocol handler intercept. The request is stored locally until the device is again online. Subsequent to establishing a connection, the stored requests are made to the beacon server.

Yahoo! Inc., unlike most companies, is interested in acquiring this high resolution usage data in order to improve the content delivered to Yahoo! Inc. users; particularly via the Yahoo! Inc. mobile applications. As discussed later, the usage data generated from this method grows quickly. Many companies lack the capacity to store the resulting cumulated information, much less gain insight from the analyzing the results.

Offline Usage Data Storage and Upload System

FIG. 1 is a block diagram of a system for tracking offline user interaction from a hardware point of view, according to one embodiment of the invention. A device 100 includes, but is in no way limited to, an input/output interface 110, input/output logic 120, a database 130, a page construction module 140, a protocol event module 150, and a data sync module 160. Database 130 includes, but is in no way limited to, pre-fetched content 132, analytic events 134, and usage data 136.

A network 102 is communicatively coupled with device 100 via input/output ("IO") interface 110. In one embodiment, network 102 could be a cellular network, or in another embodiment, the Internet. Network 102 transmits data between a server 104, also communicatively coupled to network 102, and device 100. Device 100 and network 102 are not always communicatively coupled. When device 100 and network 102 are not communicatively coupled, device 100 is "offline."

Server 104 is a machine that sends and receives data via network 102, such as, a web server, application server, proxy server, application server, etc. Server 104 is also, at least intermittently, communicatively coupled with device 100 via network 102.

An input 112 is received by device 100 at an IO interface 110. IO interface 110 may be a network interface such as a Bluetooth, Ethernet-based interface, Wi-Fi, or cellular network. Input 112 may include, but is in no way limited to, online content received by device 100, e.g., news stories, pictures, books, video, etc.

IO logic 120 is coupled to IO interface 110 and the network 102. IO logic 120 is configured to parse and distribute incoming data and prepare output 114 for sending via IO interface 110, according to an embodiment. IO logic 120 may implement one or more communication protocols. IO logic 120 is coupled to network 102, a database 130, a page construction module 140, a protocol event module 150, and a data sync module 160.

Database 130 is coupled with IO logic 120, page construction module 140, protocol event module 150, and data sync module 160. Database 130, in one embodiment, includes pre-fetched content 132, analytic events 134, and usage data 136. Database 130 may be a typical database system, e.g., SQLite, PostgreSQL, MongoDB, etc., or a proprietary database system, e.g., a flat file system, or memory allocated to storing pre-fetched content 132, analytic events 134, and usage data 136. Page construction module 140, protocol event module 150, or the data sync module 160 may access or directly write to database 130.

Pre-fetched content 132 is content that device 100 downloads from network 102 and stores locally on device 100 based on a probability that the user will request the data while device 100 is offline. For example, an application that provides news articles may pre-fetch the current edition of a newspaper so that the articles are available for the user to read even while device 100 is offline.

Analytic events 134 are events that a developer wants to track. Analytic events 134 can arise from interaction with hardware or software components, e.g., the user rotated the device, the device went to sleep, the user clicked on a link, etc. Analytic events 134 may include, but are in no way limited to, URLs captured, links viewed, links selected, and free form events; where free form events are customized events that the developer defines, e.g., the user rotated the device and selected a link. Device 100 may locally store analytic events 134, e.g., in database 130. Alternatively, device 100 may intercept or directly send analytic events 134 to protocol event module 150.

Usage data 136 is information associated with an analytic event 134. For example, in one embodiment, usage data 136 arising from an analytic event 134, e.g., selecting a link or making an Hypertext Transfer Protocol ("HTTP") request, includes the URL requested, the URL of the current page, and the text of the link that was selected. In other embodiments the request may include the href value, title, text, id or any other attribute or element associated with the anchor tag.

Usage data 136 is used to evaluate the effectiveness of a product. For example, to find out which links are the most popular, the "click through rate" ("CTR") is determined. The CTR is equal to the number of times the link was clicked, divided by the number of times the link was viewed. Usage data 136 associated with the occurrence of the analytic events 134 are stored in database 130, e.g., link X viewed and link X clicked, respectively.

Page Construction Module

Page construction module 140 is coupled with IO logic 120, database 130, protocol event module 150, and data sync module 160. A component of the system traverses the DOM of a pre-fetched page, and generates links dynamically. Page construction module 140 is not required to display the page; page construction module 140 may be used merely to track specific links for other activities such as analytical activities. Normally, when a link is selected by a user, device 100 sends a request to server 104 where usage data 136 representing the request and/or the links on the page requested are stored. In one embodiment, when a page is being viewed offline, page construction module 140 generates a request to a web beacon using the particular protocol, to which protocol event module 150 is listening.

For example, a page about to be shown to a user might be an HTML document with the following anchor tag: <a href="http://www.yahoo.com">yahoo</a>. Under these circumstances, a request to a web beacon is generated which designates the page about to be shown to a user. Under these circumstances, page construction module 140 generates the request using the "yi13n://" protocol. Instead of device 100 making a request to the web beacon, protocol event module 150, which is listening for "yi13n://" request, would intercept the request to the web beacon.

Page construction module 140 also allows the developer to track a subset of all the links on a page. Some applications may only be interested in tracking the links within a specific section of the page. For example, the developer may only be interested in tracking the links that appear above the fold of the page, before the user begins to scroll. In this case, the developer can select the links within a container, or even a specific link. Page construction module 140 may only generate requests to web beacons, or may limit web beacon data to the subset defined by the developer.

Page construction module 140 also allows a developer to refine or track additional information to be recorded. For example, a developer may want to calculate the click through rate ("CTR") of all links that include the words "buy now," compared to all the links without the words "buy now." Page construction module 140 (or another system component) may add additional information to web beacon data so that a boolean flag will be set to true if the link text includes the words "buy now." In another embodiment, page construction module 140 may add a separate attribute containing a boolean value, or text value, or any other variation that would convey the additional information.

Page construction module 140 may also allow the developer to elect whether or not to interface with device 100. In some applications, a developer may find it useful to not store usage data 136 locally, in order to get usage data 136 in real-time, or to conserve memory. Thus, in one embodiment, a developer may program his application program to pass a flag to instruct page construction module 140 to interface with the Internet directly, leaving the links un-tracked and thus bypassing protocol event module 150 and storing usage data 136 locally.

Protocol Event Module

Protocol event module 150, in one embodiment, is coupled with IO logic 120, database 130, page construction module 140, and data sync module 160. Protocol event module 150 detects when analytic events 134 take place. Protocol event module 150 subsequently generates usage data 136, representing the event(s), and either stores usage data 136 locally on device 100 or sends usage data 136 directly to data sync module 160.

There are several techniques that protocol event module 150 could use to receive or detect specific analytic events 134. In one embodiment the protocol event module 150 may detect analytic events 134 by registering a protocol handler, and intercepting analytic events 134 being transmitted across IO logic 120. In another embodiment, protocol event module 150 is directly coupled with page construction module 140. In yet another embodiment, protocol event module 150 captures analytic events stored in database 130.

Many models could be chosen to determine whether to store usage data 136 locally or to upload it right away. In one embodiment, protocol event module 150 may only store usage data 136 when device 100 is offline. In some cases, a party affiliated with device 100, such as an application, advertiser, content provider, developer, or user, needs real-time usage data 136 updates, if possible. For example, an advertiser may want to know, in real-time, how frequently a link is being viewed and how frequently a link is being selected by someone using the device during a specific window of time, e.g., during a particular super bowl commercial. While device 100 is offline, however, device 100 cannot upload any usage data 136. Thus, in one embodiment, protocol event module 150 may send usage data 136 to data sync module 160 for immediate upload instead of storing usage data 136. In yet another embodiment, the developer may program an application to pass a flag to protocol event module 150, instructing protocol event module 150 always to store usage data 136 locally, or always immediately upload usage data 136.

While many formats and libraries could be used, some are more verbose and may bloat the size of usage data 136 substantially. A format that supports structured data with little bloat is therefore desirable. Storing usage data 136 in a pre-defined non-proprietary structured format allows for more rapid development using existing libraries, but optional. In one embodiment, usage data 136 is stored in JavaScript Object Notation ("JSON") format, gzip compressed, base64 American Standard Code for Information Interchange ("ASCII") encoded, and URL-escaped. JSON is a format for storing structured data, e.g., key-value pairs, arrays, and hash maps, and is useful for storing usage data 136. However, other data formats, such as Extensible Markup Language ("XML"), YAML Ain't Markup Language ("YAML"), and many others, will also suffice.

Since usage data 136 can accumulate quickly, even on mobile devices, in one embodiment, protocol event module 150 compresses usage data 136 before usage data 136 is stored. For example, one URL can be over 2 KB. Storing thousands of viewed URLs may quickly create a large memory footprint. Usage data 136 may continue to expand as applications request additional information to be included in the usage data 136, e.g., storing software or hardware states at the time a link was selected. Other factors, including latency and bandwidth of the connection, to network 102 may require usage data 136 to be compressed before uploading or storing usage data 136 locally to device 100. Thus, in one embodiment, protocol event module 150 compresses formatted usage data 136. In another embodiment, protocol event module 150 uses a gzip library to compress usage data 136 before storing usage data 136 on device 100.

Many servers, platforms, and web services, e.g., Yahoo! Query Library ("YQL"), receive data in ASCII format, and because many compression algorithms, e.g., gzip, return a binary string, an additional step may be beneficial after compression. In one embodiment, the usage data 136 is converted to base64 ASCII. However, any number of methods to convert binary to ASCII may be used.

Still, many servers, platforms and web services receive data via a URL. Unfortunately, many binary and ASCII strings will break the URL format. "URL-escaping" converts characters into a format that can be transmitted to web servers within a URL without breaking the URL format. Server 104 then un-escapes the data to return the data to the data's prior state. Therefore, in one embodiment, based on the needs of server 104, protocol event module 150 URL-escapes the ASCII encoded string prior either to storing usage data 136 on device 100, or uploading usage data 136 to server 104. In other embodiments, escaping may be applied for formats other than a URL format, e.g., SQL queries. In another embodiment, data sync module 160 may URL-escape usage data 136. In still other embodiments, the steps for compression, encoding, and escaping may be done in any other module or component on the device and may use many different schemas for formatting, compression, encoding, and escaping. Other formats, e.g., YQL, may also be used to transfer data in a string.

Data Sync Module

Data sync module 160 is coupled with IO logic 120, database 130, page construction module 140, protocol event module 150, and, periodically at least, network 102 and server 104. Data sync module 160 uploads usage data 136 after data sync module 160 detects that the device 100 is connected to network 102, and that there is usage data 136 stored in database 130.

In many cases, particularly with mobile devices, the latency is high between device 100 and network 102. Furthermore, connecting to server 104 on network 102 can use a significant amount of power that may reduce battery life substantially. In these cases, uploading usage data 136 from many analytic events 134 at the same time may be faster, and/or more efficient, than establishing a connection after each analytic event 134 and uploading the respective usage data 136.

In an alternative embodiment, data sync module 160 may execute one or more of the previously discussed steps, including, formatting, compression, ASCII encoding, and URL-escaping, before device 100 uploads usage data 136 to server 104. For example, protocol event module 150 may derive usage data 136 from analytic events 134 and store only the compressed binary string. Data sync module 160 may then convert the binary string to a base64 ASCII string and URL-escape the result. Data sync module 160 may subsequently upload the compressed, base64, URL-escaped data over network 102.

Illustration of an Application Tracking Offline Usage Data

Figure 2:
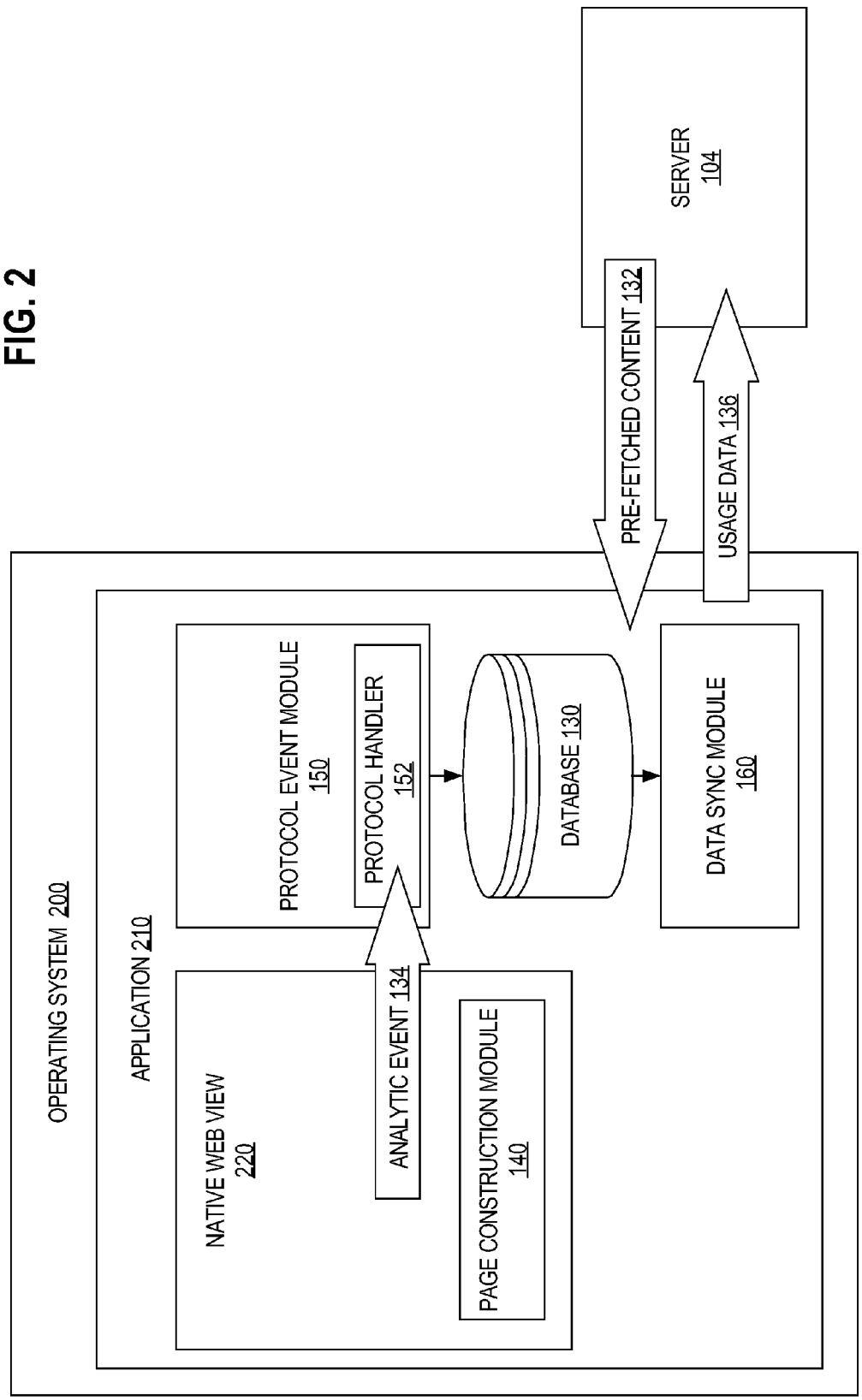
FIG. 2 illustrates an application tracking offline usage data, according to one embodiment of the invention.

FIG. 2 illustrates an application 210 tracking, and subsequently uploading, offline usage data 136 according to one embodiment of the invention. In this example, application 210 includes, but is in no way limited to, a native web view 220, database 130, page construction module 140, protocol event module 150, and data sync module 160. Application 210, runs within, and is communicatively coupled with, an operating system 200.

In this example, server 104 both provides pre-fetched content 132 and receives uploaded usage data 136. However, many other configurations are possible; this illustrated example need not be performed on a single server connected to a particular network.

In this example, as part of initialization of application 210, protocol event module 150 registers a protocol handler 152 with underlying operating system 200, specifying a callback function that intercepts any requests over a particular protocol. Protocol event module 150, in this example, may also be communicatively coupled with native web view 220 and may receive analytic events 134 directly. In another embodiment, application 210 may be sandboxed by underlying operating system 200 of device 100, such that application 210 only intercepts the outbound requests of a particular protocol. This feature allows each application to have the same particular protocol but only receive the outbound requests made by that instance of the application.

Application 210 initially is communicatively coupled with server 104. Application 210 pre-fetches content from server 104 and stores pre-fetched content 132 on the database 130. In this example, pre-fetched content 132 is content that includes a web page, e.g. HTML, pictures, fonts, video, etc., to be viewed in native web view 220.

Native web view 220 then loads pre-fetched content 132. In this example, pre-fetched content 132 includes a reference to page construction module 140. Page construction module 140 traverses the DOM of the pre-fetched content 132 and updates all of the links designated by pre-fetched content 132 to use a particular protocol, e.g., "yi13n://."

After native web view 220 loads the modified pre-fetched content 132, an analytic event 134 is sent to protocol event module 150. Protocol event module 150 stores usage data 136 in database 130, which notes that pre-fetched content 132 and links included within pre-fetched content 132 have been viewed. Furthermore, if a link is selected (or mouse-clicked on) in native web view 220, then operating system 200 makes an outbound request using the particular protocol. Instead of operating system 200 making an outbound request to server 104, the request is intercepted by protocol event module 150 as an analytic event, via the protocol handler 152, and the specified callback function. Protocol event handler 152 then stores usage data 136, derived from the analytic event 134, in database 130.

Data sync module 160 determines if usage data 136 has been stored in database 130, and if so, data sync module 160 then determines whether there is currently a connection between application 210 and server 104. If usage data 136 is stored in the database 130 and if there is a connection between application 210 and server 104, then data sync module 160 uploads stored usage data 136 to server 104.

Example Processes

Figure 3A:
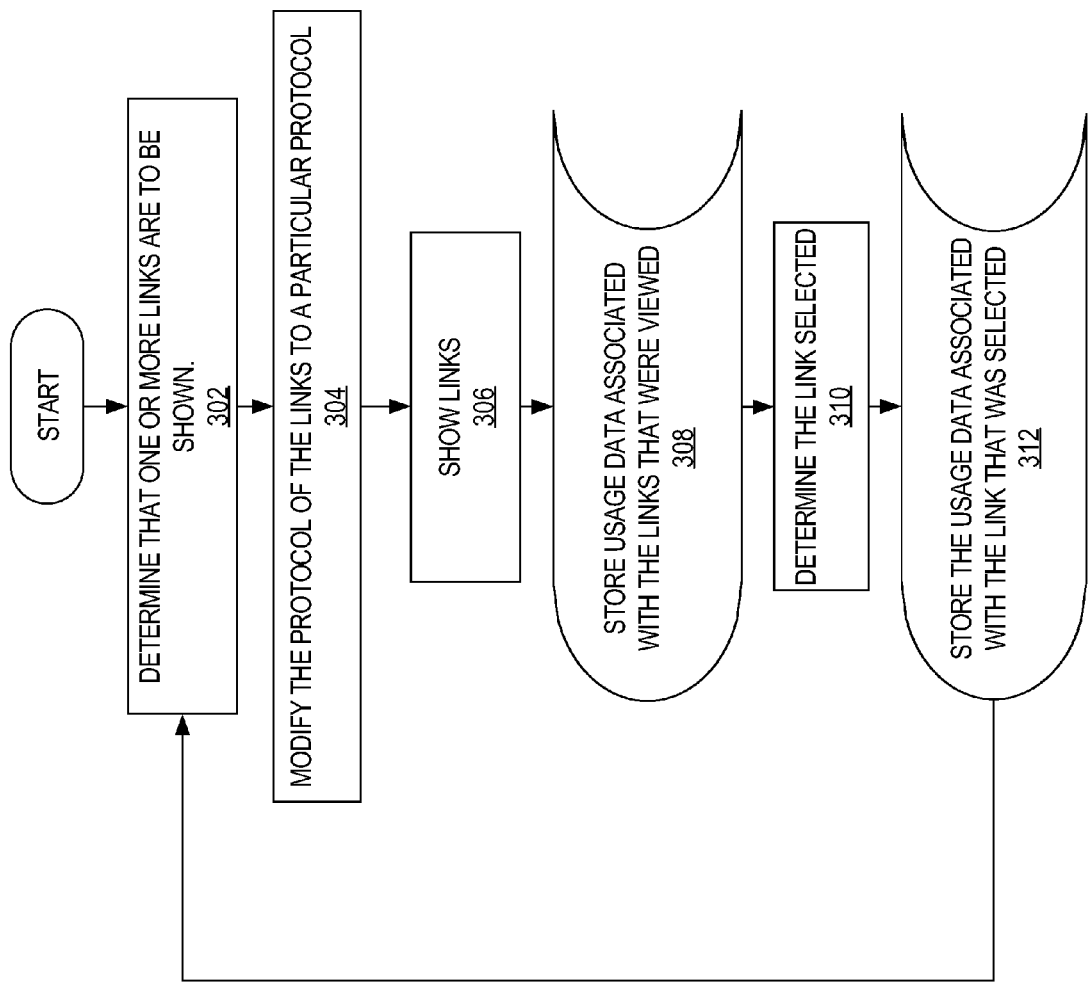
FIG. 3A is a flowchart illustrating an offline usage data tracking process, according to one embodiment of the invention.
Figure 3B:
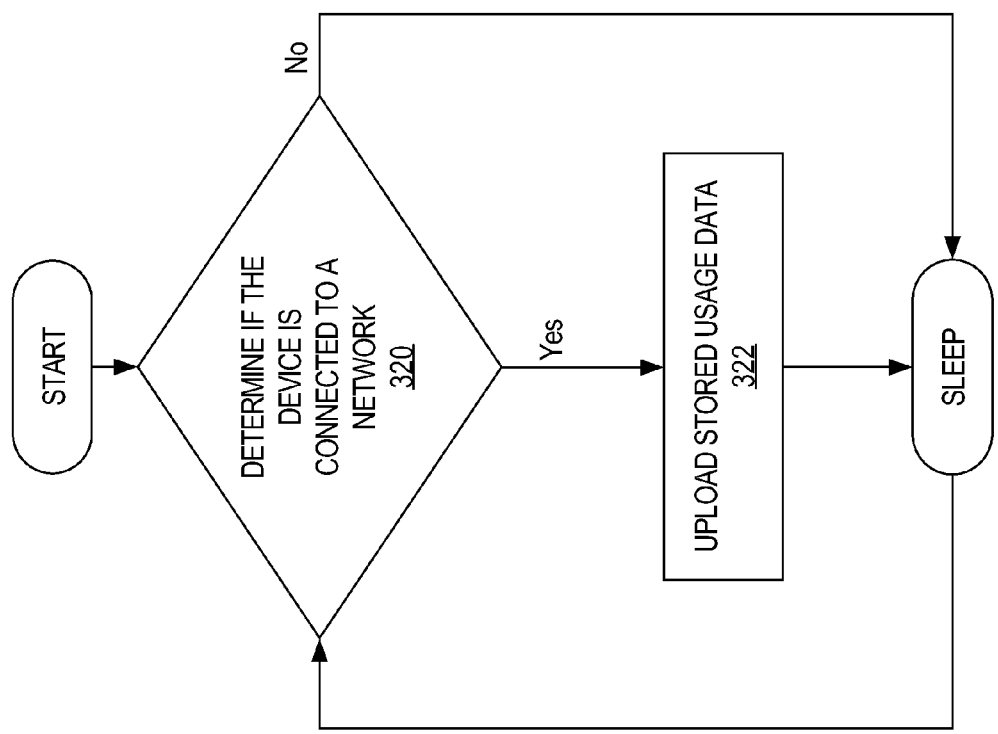
FIG. 3B is a flowchart illustrating an usage data uploading process, according to one embodiment of the invention.

FIGS. 3A and 3B are illustrations of processes running within device 100 concurrently. However, these are merely some embodiments. Other embodiments may not involve concurrently executing processes. FIG. 3A is a flowchart illustrating a process for tracking offline usage data. FIG. 3B is a flowchart illustrating a process for uploading the stored usage data asynchronously. While FIGS. 3A and 3B illustrate exemplary steps according to one embodiment, other embodiments may omit, add to, reorder, and/or modify any of the steps shown. Although this embodiment discusses tracking links viewed and clicked, other embodiments may include many other analytic events based on the application and device.

As shown in FIG. 3A, in step 302, application 210 determines that one or more links are to be shown, e.g., a web page has been requested. This embodiment refers to links, but any data item could be used. Such a data item can be anything that is seen, heard, or interacted with by a user on the device. Such a data item may be associated with or derived from pre-fetched content 132.

After application 210 has determined which links to show, in step 304, page construction module 140 dynamically generates requests with the particular protocol, e.g., "yi13n://." Page construction module 140 need not modify all the links. Page construction module may only modify the links within a specific element, set of elements, or individual links. The requests that are intercepted by protocol event handler 152 are derived from the links that are modified by page construction module 140.

In step 306, the application 210 shows the updated links. In one embodiment, similar to the embodiment illustrated in FIG. 2, the links may be part of a web page shown in native web view 220.

In step 308, protocol event module 150 stores usage data 136 in database 130 logging that the links were shown in the native web view 220. In this embodiment, prior to storing usage data 136 in database 130, protocol event module 150 formats the usage data into a structured data format, e.g., JSON. Protocol event module 150 then compresses the formatted usage data 136, using a compression algorithm such as gzip, DEFLATE, or LZX. Next, protocol event module 150 encodes the formatted and compressed usage data 136 into ASCII. Then protocol event module 150 URL-escapes the formatted, compressed, and encoded usage data 136. Lastly, protocol event module 150 stores the formatted, compressed, encoded, and escaped user data 136 in database 130. In other embodiments usage data 136 may be stored in database 130 but not be formatted, compressed, encoded, or escaped. In still other embodiments, database 130, or data sync module 160, may format, compress, encode or escape usage data 136.

In step 310, Device 100 determines which link, of the viewed links, is selected, creating an analytic event. One possible decision by the user could be to return to a previous set of links, but this action may be abstracted away to a "back" link that creates an analytic event.

In step 312, usage data 136 associated with the link that was selected, is stored. This step is similar to step 308, in that usage 136 data may be formatted, compressed, encoded, and escaped at this point, but these operations could be readily executed at other points within the process, and by other modules or components. Other embodiments may also include a separate thread or instance that is solely responsible for formatting, compressing, encoding, and escaping usage data 136.

In this embodiment, the process then repeats as the user continues to browse links. In other embodiments, there may be decision branches or other analytic events captured. This embodiment is not intended to be exhaustive.

FIG. 3B is a flowchart illustrating a process for uploading the stored usage data 136. The process described with reference to FIG. 3B may run concurrently with the exemplary process illustrated in FIG. 3A. While FIG. 3B illustrates steps according to one embodiment, other embodiments may omit, add to, reorder, and/or modify any of the steps shown.

In step 320, the data sync module 160 determines if device 100 is connected to network 102. If device 100 is not connected, following no branch of step 320, then the process simply sleeps for an amount of time based on user settings or other considerations.

Alternatively, if the device is connected to a network, following yes branch of step 320, then the data sync module uploads the stored usage data, in step 322. In one embodiment, in step 322, data sync module 160 may also format, compress, encode, or escape usage data 136 before usage data 136 are uploaded. After uploading the stored usage data, in step 322, the process sleeps for an amount of time based on the latency of the connection, bandwidth of the connection, power consumption parameters, battery power remaining, parameters defined by the system or the user, or any other considerations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
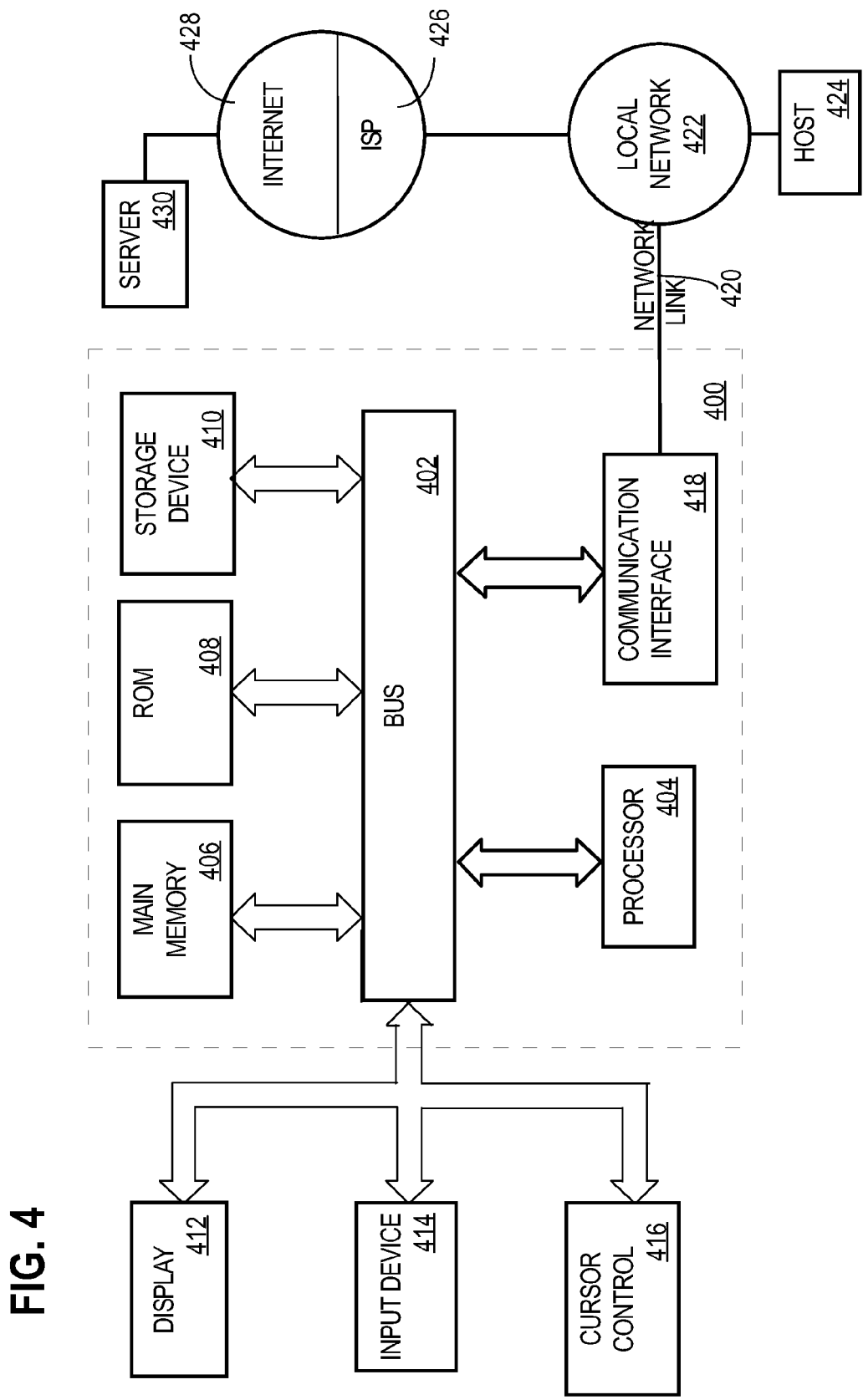
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
registering, by an application, a protocol handler on a client device to intercept analytic events that are associated with a particular protocol and that are sent by the application;
traversing, by the application on the client device, a web page for one or more items, wherein the traversing comprises a page construction module modifying a protocol of the one or more items to the particular protocol; and
generating an analytic event based, at least in part, on the one or more items;
after registering the protocol handler, the protocol handler receiving the analytic event associated with the particular protocol;
storing, on the client device, usage data that comprises information about the analytic event;
subsequent to storage of the usage data, determining that the client device is connected to a server; and
in response to determining that the client device is connected to the server, uploading the usage data from the client device to the server.

2. The method of claim 1, further comprising:
pre-fetching content from a content server;
disconnecting from the content server;
wherein traversing comprises traversing the web page for the one or more items prior to displaying one or more items that are within the content.

3. The method of claim 1 comprising:
setting a flag which, when set, causes the usage data always to be stored on the client device before being uploaded to the server, and when not set, causes the usage data to be uploaded to the server in real-time unless the client device is not connected to the server.

4. The method of claim 1 comprising:
prior to uploading the usage data, compressing the usage data, or encoding the usage data into American Standard Code for Information Interchange format, or escaping the usage data.

5. The method of claim 1 comprising:
determining that the client device is not currently connected to the server;
storing the usage data on the client device in response to determining that the client device is not currently connected to the network.

6. The method of claim 1 comprising:
detecting user interaction with one or more first items within the web page displayed on the client device;
determining whether the one or more first items were presented or selected.

7. The method of claim 1 comprising:
prior to detecting that the client device is not connected to the server, pre-fetching items with which the user can interact while the client device is not connected to the server.

8. The method of claim 1 comprising:
computing an interval based at least in part on a latency of a connection to the server; and
in response to determining that the client device is connected to the server, and after a lapse in time greater than the interval, from a time of a previous upload, uploading the usage data to the server.

9. The method of claim 1 comprising:
prior to uploading the usage data, compressing the usage data.

10. The method of claim 9 comprising:
subsequent to compressing the usage data, encoding the compressed usage data into American Standard Code for Information Exchange; and
subsequent to encoding the compressed usage data into American Standard Code for Information Exchange, escaping the usage data into a Uniform Resource Locator-escaped string.

11. One or more non-transitory storage media storing instructions which, when executed by one or more computing devices, cause performance of a method comprising:

registering, by an application, a protocol handler on a client device to intercept analytic events that are associated with a particular protocol and that are sent by the application;

traversing, by the application on the client device, a web page for one or more items, wherein the traversing comprises a page construction module modifying a protocol of the one or more items to the particular protocol; and generating an analytic event based, at least in part, on the one or more items;

after registering the protocol handler, the protocol handler receiving the analytic event associated with the particular protocol;

storing, on the client device, usage data comprising information about the analytic event;

subsequent to storage of the usage data, determining that the client device is connected to a server; and in response to determining that the client device is connected to the server, uploading the usage data from the client device to the server.

12. The one or more non-transitory storage media of claim 11, the method comprising:
pre-fetching content from a content server;
disconnecting from the content server;
wherein traversing comprises traversing the web page for the one or more items prior to displaying one or more items that are within the content.

13. The one or more non-transitory storage media of claim 11, the method comprising:
setting a flag which, when set, causes the usage data always to be stored on the client device before being uploaded to the server, and when not set, causes the usage data to be uploaded to the server in real-time unless the client device is not connected to the server.

14. The one or more non-transitory storage media of claim 11, the method comprising:
prior to uploading the usage data, compressing the usage data, or encoding the usage data into American Standard Code for Information Interchange format, or escaping the usage data.

15. The one or more non-transitory storage media of claim 11, the method comprising:
determining that the client device is not currently connected to the server;
storing the usage data on the client device in response to determining that the client device is not currently connected to the network.

16. The one or more non-transitory storage media storing of claim 11, the method comprising:
detecting user interaction with one or more first items within the web page displayed on the client device;
determining whether the one or more first items were presented or selected.

17. The one or more non-transitory storage media of claim 11, the method comprising:
prior to detecting that the client device is not connected to the server, pre-fetching items with which the user can interact while the client device is not connected to the server.

18. The one or more non-transitory storage media of claim 11, the method comprising:
computing an interval based at least in part on a latency of a connection to the server; and
in response to determining that the client device is connected to the server, and after a lapse in time greater than the interval, from a time of a previous upload, uploading the usage data to the server.

19. The one or more non-transitory storage media of claim 11, the method comprising:
prior to uploading the usage data, compressing the usage data.

20. The one or more non-transitory storage media of claim 19, the method comprising:
subsequent to compressing the usage data, encoding the compressed usage data into American Standard Code for Information Exchange; and
subsequent to encoding the compressed usage data into American Standard Code for Information Exchange, escaping the usage data into a Uniform Resource Locator-escaped string.

* * * * *